(12) United States Patent
Wortelboer

(10) Patent No.: US 8,027,232 B2
(45) Date of Patent: Sep. 27, 2011

(54) DEVICES AND METHODS FOR DETERMINING A CRITICAL ROTATION SPEED OF AN OPTICAL DATA CARRIER, MONITORING A CONDITION OF AN OPTICAL DATA CARRIER, AND GENERATING A REFERENCE SIGNAL

(75) Inventor: Pippinus Maarten Robertus Wortelboer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 327 days.

(21) Appl. No.: 12/305,036

(22) PCT Filed: Jun. 14, 2007

(86) PCT No.: PCT/IB2007/052256
§ 371 (c)(1),
(2), (4) Date: Dec. 16, 2008

(87) PCT Pub. No.: WO2007/148265
PCT Pub. Date: Dec. 27, 2007

(65) Prior Publication Data
US 2009/0168621 A1    Jul. 2, 2009

(30) Foreign Application Priority Data
Jun. 20, 2006  (EP) .................................... 06115725

(51) Int. Cl.
*G11B 7/00* (2006.01)

(52) U.S. Cl. ............... 369/44.32; 369/47.38; 369/53.12; 369/53.14

(58) Field of Classification Search ............... 369/44.27, 369/44.32, 47.38, 47.39, 47.4, 47.44, 47.41, 369/53.12, 53.14, 53.37
See application file for complete search history.

(56) References Cited

U.S. PATENT DOCUMENTS

| 5,844,866 | A | 12/1998 | Fujimoto et al. | |
|---|---|---|---|---|
| 6,097,680 | A | 8/2000 | Yen et al. | |
| 6,185,171 | B1 | 2/2001 | Bassett et al. | |
| 6,826,136 | B1 * | 11/2004 | Jeong | 369/47.44 |
| 7,339,863 | B2 * | 3/2008 | Usui et al. | 369/47.41 |
| 7,813,232 | B2 * | 10/2010 | Yamauchi et al. | 369/44.32 |
| 2001/0046196 | A1 | 11/2001 | McKernan | |
| 2003/0147314 | A1 | 8/2003 | Kondo et al. | |
| 2004/0085868 | A1 | 5/2004 | Ohno et al. | |
| 2004/0100886 | A1 | 5/2004 | Hsu | |
| 2005/0073924 | A1 | 4/2005 | Yamashiro | |

FOREIGN PATENT DOCUMENTS

EP    0821356 A2    1/1998

OTHER PUBLICATIONS

The Written Opinion of the International Searching Authority, PCT/IB2007/052256.

* cited by examiner

*Primary Examiner* — Wayne Young
*Assistant Examiner* — Brenda Bernardi

(57) ABSTRACT

A device determines a critical rotation speed of an optical data carrier at which a critical deflection of said optical data carrier may occur. The device includes a drive unit, a measurement unit and a determination unit. The drive unit rotates the optical data carrier according to a sweep covering a predetermined range of rotation speeds. The measurement unit generates a measurement signal indicative of a distance between a surface of the optical data carrier and a reference position corresponding to the sweep. The determination unit determines the critical rotation speed of the optical data carrier by processing the measurement signal on the basis of at least one characteristic of the measurement signal.

21 Claims, 7 Drawing Sheets

Figure 1:
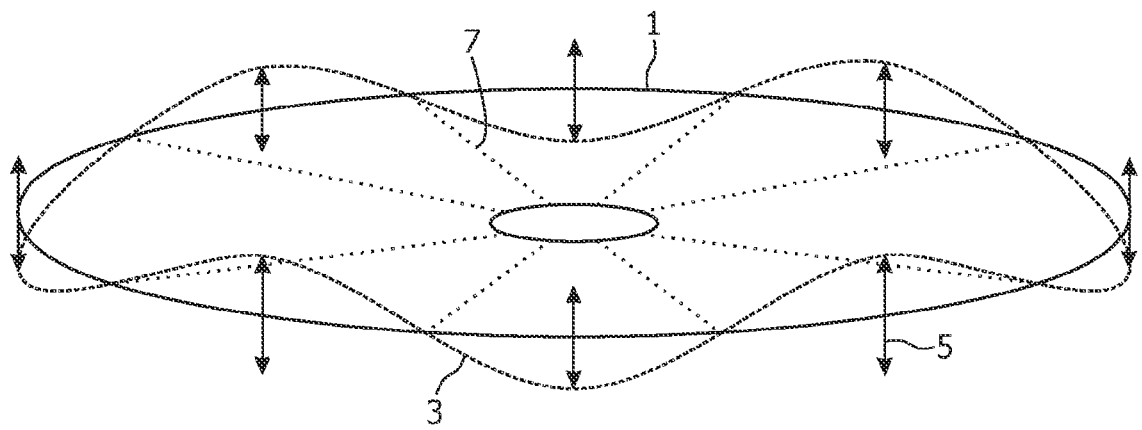

DEVICES AND METHODS FOR DETERMINING A CRITICAL ROTATION SPEED OF AN OPTICAL DATA CARRIER, MONITORING A CONDITION OF AN OPTICAL DATA CARRIER, AND GENERATING A REFERENCE SIGNAL

The invention relates to a device and a method for determining a critical rotation speed of an optical data carrier at which a critical deflection of said optical data carrier may occur in said device, an apparatus and a method for monitoring a condition of an optical data carrier, an apparatus and a method for reading data from and/or writing data to an optical data carrier, and a device and a method for generating a reference signal to be used for determining a critical rotation speed of an optical data carrier. The invention further relates to corresponding computer programs.

The data throughput of a read or write operation in an optical disc drive is determined by the density at which the data is recorded on the optical disc or optical data carrier and by the speed at which the optical data carrier is rotated during the operation. For a given data density on the data carrier, the throughput may be increased by increasing the speed or rotation frequency of the data carrier.

During operation of the disc drive the optical disc may exhibit tilt and deflection due to a number of different causes, e.g. an imbalance or a static deformation of the disc. Usually there is a control member provided in the disc drive to keep the focus of the read-out or recording beam of the optical pickup unit (OPU) at the surface or plane of the disc which is to be read out or recorded to.

At high disc speeds in optical drives, an oscillation of the disc should be kept within bounds to avoid large deflections and tilt, which may compromise read and write performance. Dynamic deformations of the disc may even lead to an explosion of the disc at high speed. Thus, a stable spinning of the disc is desired both for reasons of safety and for reasons of performance. Since optical drives are to be used with different discs and with discs of different kinds in general, the designers are faced with the requirement to provide for many different combinations of disc drives and data carriers. This problem is further complicated by different kinds of optical data carriers, e.g. CD, DVD, BD, and sub-types, having different mechanical structures and therefore different dynamic behaviors.

At certain speeds (usually above 100 Hz) a disc may excite itself and start oscillating without any external excitation. The frequencies or speeds at which this happens depend on both disc properties and drive properties. With a sophisticated design these frequencies may be shifted, but they cannot be cancelled completely. In order to avoid large deflections and damage in the long run, the critical frequency or the critical frequencies should be avoided as much as possible.

A common approach to ensure safety and sufficient performance is to restrict the rotation speed to a range that is considered to be safe for all possible combinations. The disadvantage of this approach is that some disc-drive combinations allowed to operate at a higher speed, i.e. with better data throughput, are operated at an unnecessarily low speed.

According to another approach, the disc is rotated at a comparatively high rotation speed to start with and the speed is decreased if it is found that the performance is bad (e.g. as regards a focus control which is too slow for the occurring oscillations). A danger of this approach is that the speed may be too high and that the drive and/or the disc may be damaged.

It is also possible for a specific combination of disc and drive to increase the speed beyond a critical speed in order to reach a speed range with reduced oscillations again. This requires a thorough knowledge of what happens at higher speeds in general and of the interaction between the disc and the drive. At least it is necessary to know which the particular critical speed is.

It is an object of the present invention to provide a device and a method for determining a critical rotation speed of an optical data carrier at which a critical deflection of said optical data carrier may occur in the device, which device and method allow for a rotation of the data carrier at a high, yet safe rotation speed without endangering the device and/or the data carrier, e.g. by actually sampling a rotation of the optical data carrier at a possible or assumed critical rotation speed.

In order to achieve this object, a device is proposed for determining a critical rotation speed of an optical data carrier at which a critical deflection of said optical data carrier may occur in said device, said device comprising a drive unit for rotating said optical data carrier, said drive unit being adapted for rotating said optical data carrier according to a sweep covering a predetermined range of rotation speeds, a measurement unit for generating a measurement signal indicative of a distance between a surface of said optical data carrier and a reference position corresponding to said sweep, and a determination unit for determining said critical rotation speed of said optical data carrier by processing said measurement signal on the basis of at least one characteristic of said measurement signal.

Furthermore, a corresponding method and a computer program comprising program code means for causing a device for determining a critical rotation speed of an optical data carrier to perform such a method when said computer program is run on said device are proposed.

The present invention is based on the recognition that very profound disc oscillations in a drive may manifest themselves as a stationary waveform and may not be observed easily by the common optical pickup unit (OPU) control. A deflection and/or related tilt may exhibit a comparatively great, virtually constant amplitude (comparable to a DC value), wherein, for example, at the point of focus of an OPU objective lens there may be no change in this amplitude (i.e. no AC component) of the deflection. The origin of the deflection cannot be traced from the DC signal of the focus actuator of the OPU control since if may be a stationary wave form, a tilted disc-motor, as well as a disc having a cup or umbrella shape. Furthermore, it may occur that at the point of focus of the OPU there is no or little deflection and much tilt, with a "node" in the waveform.

There are at least two characteristic expressions of a stationary waveform. First, the deflection is considerably greater than the smallest speed deflection during a number of cycles (unless the stationary waveform has a "node" locally) and, second, the deflection remains constant for a number of cycles and then starts "oscillating" rather violently (this also happens for a stationary wave form with a local "node" that transforms into a next stationary wave with fewer (usually for a spin-down) or more (usually for a spin-up) ripples).

It has been found that the dynamic behavior at a constant frequency or speed derived from, for example, focus actuator signals is insufficient to identify a critical speed since the phenomenon of self-excitation may stay undetected or may be confused with other events or features of the data carrier or the device. It has been realized that by utilizing a predetermined frequency sweep instead of sampling a constant rotation frequency, multiple dynamic phenomena are excited, leading to a signal or signal history that is characteristic of the particular combination of disc and drive. The dynamic features of the combination of disc and drive can be derived from the processing the signal corresponding to the movement of a point on the surface of the optical data carrier or on the envelope of the surface, and thus at least one critical rotation speed can be predicted or identified. The term "signal" as used herein refers not to a single value at a particular point in time but to a sequence of different values over a period of time.

Furthermore, the sweep may include an iteration of different sub-sweeps, wherein the choice of which (kind of) sub-sweep is done next may be based on the result of the processing of the measurement signal of the previous sub-sweep. In general, a sweep, or sub-sweep, is characterized by a start speed (or frequency), an end speed (or frequency), a sweep time, a sweep mode (e.g. linear or logarithmic), and a radius at which the sweep is performed on the optical data carrier. The radius may change during a sweep. A trade-off has to be found in practice between accuracy and comfort. With a large number of sweeps and sub-sweeps an almost perfect accuracy may be achieved; but this will also take a comparatively long time. The same applies to the amount of data. A larger database of reference signals and sub-sweeps for accuracy also implies extra efforts for storing the data and extra time for processing the data.

According to another embodiment of the present invention, said determination unit is adapted for processing said measurement signal by comparing said measurement signal with at least one predetermined reference signal.

It is possible to examine the dynamic behavior of a number of reference discs in a dedicated reference drive corresponding to the device for determining a critical rotation speed and to determine one or more critical rotation speeds of these reference discs in this reference drive. Thus, a number of reference signals is generated which are stored within the device or disc drive for comparison with a measurement signal generated during a check of the actual data carrier in the device. It can be concluded from a sufficient similarity between a reference signal and the measurement signal that the data carrier in the drive exhibits substantially the same dynamic behavior as the corresponding reference disc in the reference drive, i.e. the critical rotation speed(s) is (are) the same for both the particular combination of data carrier and device and the particular combination of reference disc and reference drive. By identifying the combination of reference disc and reference drive that exhibits a dynamic behavior or signal which is most similar to the actually measured signal or behavior during the sweep, one can now predict the critical rotation speed(s) of the combination at hand of optical data carrier and device for determining a critical rotation speed (e.g. a consumer's disc drive) without actually having to rotate the data carrier at such a speed. This is a somewhat indirect way to process the measurement signal for determining a critical rotation speed, wherein the characteristic of the measurement signal on which the processing is based is a similarity of the measurement signal to at least one reference signal.

It is not necessary to apply the comparison to the complete measurement signal/reference signal. In some embodiments, only predetermined parts of the signals are compared with each other. Neither is it necessary to compare the raw data measurement data since the signals may be processed otherwise before a comparison. The terms "measurement signal" and "reference signal" are to be understood as including derivatives of the respective signals (including but not limited to derivatives in a mathematical sense of differentiation), e.g. compressed representations of the original signals.

According to a preferred embodiment of the present invention, said determination unit is adapted for comparing said measurement signal with said at least one predetermined reference signal by calculating an inner product of said measurement signal and said reference signal, and/or by adding up squares of differences between said measurement signal and said reference signal, and/or by comparing a period between consecutive intersections of said measurement signal with a predetermined line parallel to the abscissa with a period between consecutive intersections of said reference signal with said line, in particular averaged over a predetermined period of time.

Calculating an inner product of the measurement signal and the reference signal, possibly followed by a normalization (i.e. a division by an inner product of the reference signal with itself), gives a simple rate of similarity between the measurement signal and the reference signal. The closer the resulting value after a normalization comes to unity, the more similar the measurement signal and the reference signal are. Another simple way of obtaining a rate of similarity is to add up squares of differences between the measurement signal and the reference signal similar to the well known "least-squares-method", resulting in a correlation value. A further method comprises the comparison of the period or periods between one moment at which the measurement signal assumes a given value and the next moment the measurement signal assumes said value with the period between moments at which the reference signal assumes said value. An easy way to achieve such a comparison is to compare the times between zero crossings, for which a number of consecutive periods are taken into account and averaged.

There are different ways to proceed with the results of the comparison. One way is to take the critical speed(s) associated with the reference signal that is most similar to the measurement signal as the critical speed(s) of the optical data carrier in the device. A more conservative way is to take the critical rotation speeds of a predetermined number of the most similar reference signals as the critical rotation speeds of the combination of data carrier and device at hand. Another way is to define a predetermined threshold for the similarity rating, i.e. if a reference signal is at least as similar to the measurement signal as defined by the threshold, the corresponding critical rotation speed(s) is (are) assumed to be (one of) the critical rotation speed(s) of the data carrier in the device. Combinations of these approaches are also possible.

The higher the threshold value, the more similar the measurement signal and reference signal in the case of a match. Accordingly, the determined critical rotation speed(s) is (are) close to the actual critical rotation speed(s). However, a high threshold may result in a number of cases in which no match between a reference signal and a measurement signal can be found, i.e. cases in which a critical rotation speed cannot be determined by this threshold method.

According to another embodiment of the invention, said determination unit is adapted for processing said measurement signal by performing a pattern recognition on said measurement signal.

With the pattern recognition the "shape" of the signal itself is processed. One feasible way to perform this pattern recognition is to perform a time/frequency analysis of the measurement signal, for example based on a wavelet analysis, to extract the gist of the measurement signal that renders it possible to determine a critical rotation speed. Another way is to feed the measurement signal into a decision logic or an expert system, e.g. with a previously trained artificial intelligence, which is capable of determining a critical rotation speed based on a set of rules and/or examples.

In an advantageous embodiment of the present invention, the approaches of a pattern recognition and a comparison to reference signals are combined. If all reference signals differ too much from the measurement signal, i.e. no reference signal is as similar to the measurement signal as defined by a given threshold value, the pattern recognition approach is used instead. Alternatively, the two approaches are used in parallel, and all determined results are considered to be critical rotation speeds.

In another preferred embodiment of the invention, said measurement unit comprises an optical unit for directing a radiation beam that is focused onto a surface of said optical data carrier, said reference position being the position of a focus of said radiation beam.

In common optical drives, the optical pickup unit (OPU) is often provided with a control member to ensure that the focus of the radiation beam used by the OPU to read out or to write data remains within a certain range around the plane or surface of the data carrier from with data is read out or to which data is written. Thus, the position of a surface of the optical data carrier relative to the OPU or the focus can be measured without any physical contact between the surface of the data carrier and the OPU. Furthermore, the existing hardware in common disc drives may be used in that the actuator signal generated by the control member is taken as the measurement signal. No change in hardware would thus be necessary to implement the present invention in these disc drives.

According to yet another embodiment, said measurement unit is adapted for generating a rotation timing signal associated with said measurement signal, said determination unit being adapted for using said rotation timing signal for processing said measurement signal.

The rotation signal is a time mark, i.e. it indicates a predetermined number of rotations, and may be used to correlate the measurement signal with the reference signal. The rotation signal renders it possible to rescale and to reposition a measurement signal in its timeline in order to fit the timing of the measurement signal to the timing of a reference signal.

In an advantageous embodiment of the present invention, said sweep includes an acceleration of said optical data carrier during a start-up of said device and/or a deceleration of said optical data carrier, in particular a non-driven or freewheeling deceleration of said optical data carrier.

If the acceleration of the optical data carrier or disc is used for or within the sweep, the time necessary for a start-up of the device is only slightly increased or not increased at all. The term "start-up" refers to the time between a power-up or switch-on of the device or the insertion of the optical data carrier and the moment at which the device is operable, i.e. when data can be read out from and/or written to the optical data carrier in normal operation. In a powerless or non-driven deceleration or spin-down of the optical data carrier, additional influences of the drive are eliminated and the dynamic behavior of the data carrier depends only on the data carrier and the spatial conditions within the drive, e.g. the (disturbed) air flow around the disc in the drive.

According to another embodiment of the present invention, said sweep includes a sub-sweep of slow speed and a sub-sweep of medium speed for determining a static shape of said optical data carrier.

At a slow speed there will be no deformations of the optical data carrier due to inertia or centrifugal forces, i.e. the data carrier will remain substantially in its static shape. Changes in the distance between a surface of the optical data carrier and the reference point may reflect the fact that the data carrier is somewhat warped, thus rendering possible a determination of the static shape of the data carrier. At a medium speed the disc will "stretch" somewhat owing to centrifugal forces, and the static deformation is reduced to some extent. If there are still changes in the distance between a surface of the optical data carrier and the reference point, e.g. if there is a need for a changing a focus actuator signal for keeping the focus of the OPU on the disc, these changes may result, for example, from an unbalanced mounting of the disc or causes on the side of the drive. Vibrations due to an imbalance can be recognized and filtered out since they are directly coupled to the rotation frequency.

According to yet another embodiment of the present invention, said sweep includes a period of constant rotation speed.

A rotation of the disc at a constant rotation speed during the sweep allows a dynamic behavior related to the particular rotation speed to establish itself to an extent which is larger than in a case in which there is an acceleration or deceleration that passes through this particular rotation speed. This makes it easier to detect this dynamic behavior, whereby the processing of the measurement signal is facilitated.

In another embodiment of the present invention, the device for determining a critical rotation speed of an optical data carrier further comprises a device identifier identifying said device and a data unit for recording said determined critical rotation speed and/or said measurement signal together with said device identifier on said optical data carrier.

Whether or not a particular rotation speed is a critical rotation speed for a given combination of a drive and a data carrier depends both on the drive and on the data carrier. However, a critical rotation speed of the particular data carrier in the particular drive may change over time, in particular because of aging of the data carrier. Some minor changes may result from temperature shifts. The recording of a device identifier, e.g. a serial number of the device, together with the measurement signal and/or the determined critical rotation speed renders possible an observation or monitoring of changes of the critical rotation speed over time. If a sufficiently large change in a critical rotation speed occurs, this may indicate that the data carrier wears out, e.g. due to aging or excessive stress, and that it should be replaced and the data recorded thereon should be stored elsewhere.

According to a further aspect of the present invention, an apparatus is proposed for monitoring a condition of an optical data carrier, said apparatus comprising a device for determining a critical rotation speed of said optical data carrier as set forth above, a device identifier identifying said device, a data unit for recording said determined critical rotation speed and/or said measurement signal together with said device identifier on said optical data carrier and for reading a recorded critical rotation speed and/or a recorded measurement signal previously recorded by said apparatus on said data carrier, and a monitoring unit for comparing said determined critical rotation speed with said recorded critical rotation speed and/or for comparing said generated measurement signal with said recorded measurement signal.

Furthermore, a corresponding method and a computer program comprising program code means for causing an apparatus for monitoring a condition of an optical data carrier to perform such a method when said computer program is run on said apparatus are proposed.

After a critical rotation speed has been determined according to the invention, the determined critical rotation speed is recorded together with a device identifier, e.g. a serial number of the device, so as to determine the critical rotation speed. At a later point in time the determination of a critical rotation speed is repeated and the result of this determination is compared with at least one previously recorded result or to a number of previously recorded results. If the latest result does not deviate from a previous result, it is probable that no change has occurred in the optical data carrier and the device. However, if there is a deviation, this may indicate a deterioration of the optical data carrier. The additional recording the device identifier ensures that the present result is only compared with a previous result of the same combination of data carrier and device.

According to yet another aspect of the present invention, an apparatus for reading data from and/or writing data to an optical data carrier is proposed, said apparatus comprising a device for determining a critical rotation speed of said optical data carrier as set forth above and a read-write unit for reading data from and/or writing data to said optical data carrier, wherein said drive unit of said device is adapted for avoiding a rotation of said optical data carrier at said determined critical rotation speed during a reading and/or writing of said read-write unit.

Furthermore, a corresponding method and a computer program comprising program code means for causing an apparatus for reading data from and/or writing data to an optical data carrier to perform such a method when said computer program is run on said apparatus are proposed.

The procedure of determining and subsequently avoiding a critical rotation speed for a combination of an optical data carrier and an apparatus for reading/writing data, e.g. an optical disc and a disc drive, enhances the performance and safety of operation of the apparatus. No excessive dynamic oscillations due to self-excitation or internal excitation, which would impair the performance of the read or write process, will occur at a rotation speed that is different from a critical rotation speed. Wear and tear of the optical data carrier is reduced or avoided, and thus the process of aging or wearing out is slowed down. The risk of damage to either the apparatus or the optical data carrier is also reduced.

According to a further aspect of the present invention, a device is proposed for generating a reference signal to be used for determining a critical rotation speed of an optical data carrier, said device comprising a reference drive unit for rotating a reference disc, said reference drive unit being adapted for rotating said reference disc in accordance with a sweep covering a predetermined range of rotation speeds, a reference measurement unit for generating said reference signal indicative of a distance between a surface of said reference disc and a reference position, said reference signal corresponding to said sweep, and a surface unit for measuring the shape of said surface of said optical data carrier.

Furthermore, a corresponding method and a computer program comprising program code means for causing a device for generating a reference signal to be used for determining a critical rotation speed of an optical data carrier to perform such a method when said computer program is run on said device are proposed.

In the device for generating a reference signal, measurements of the dynamic behavior of a reference disc are possible which are generally not possible within a common disc drive. A dedicated reference drive unit is necessary for each type or for each class of types, representing the particular type or class of types. Furthermore, a dedicated reference disc is used for each type or for each class of types of optical data carriers. The features relevant for a dynamic interaction between the drive unit (including casing and other elements of the disc drive in question) and the reference disc have to be substantially identical to the features which are present in the drive in which the generated reference signal is to be used, otherwise the generated reference signal may be useless or has to be manipulated in order to provide a meaningful use of the reference signal in a device or method for determining a critical rotation speed. Additional measurements on the reference disc during operation are necessary, but these measurements must not interfere with the dynamic behavior of the data carrier, e.g. with the internal aerodynamics within the device.

It is preferred to use an optical system with light sources and sensors outside the drive unit. A standard drive of the type to be examined may thus be used in principle, wherein a modification in the form of a transparent cover (i.e. transparent at least to the light used) is sufficient. The optical system comprises a plurality of light sources and a sensor, e.g. a high-speed camera, wherein the light emitted by the light sources is reflected by a mirror surface of the reference disc. The mirror surface of the reference disc is preferably a flat surface when the reference disc is not rotated. It will be warped during operation due to the deflection of the reference disc. Monochromatic light is preferably used, so dispersion effects are negligible. The reflected images of the light sources detected by the sensor serve to determine the shape of the mirror surface of the reference disc without an impact on the dynamic behavior, which would impair the significance of the measured reference signal. Monitoring of the shape of the optical data carrier renders it possible to detect critical rotation speeds. Possible criteria for deciding whether or not a rotation speed is critical are, for example, the absolute value of a deformation of the data carrier and the frequency of an oscillation of the surface of the data carrier. The reference signal may be measured simultaneously or separately. A separate measurement of the reference signal corresponding to the sweep to be performed for determining a critical rotation speed as set forth above is preferable if the sweep does not extend up to the highest possible speed, in order to reduce the risk of damage to the optical data carrier and/or drive.

An apparatus for reading out/writing data to an optical data carrier according to the present invention, e.g. a consumer's disc drive according to the present invention, may be provided with the reference data by the manufacturer beforehand, i.e. with the parameters of the sweep(s) and the corresponding reference signals for a variety of different (classes of) types of optical data carrier. Furthermore, it is also possible to provide at least some of these data on the optical data carrier itself, the data being read out by the apparatus from the data carrier and used thereafter.

Figure 2:
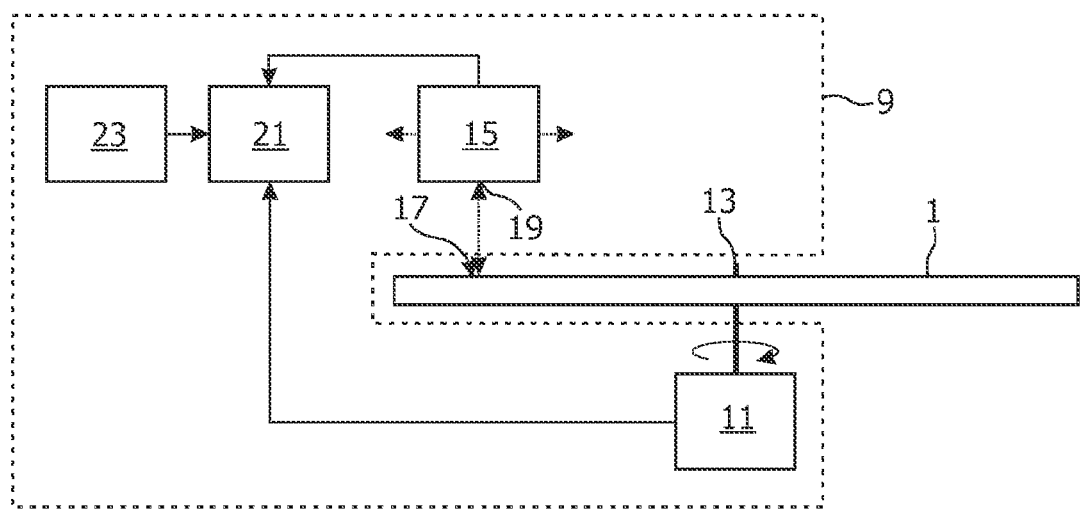
Figure 3:
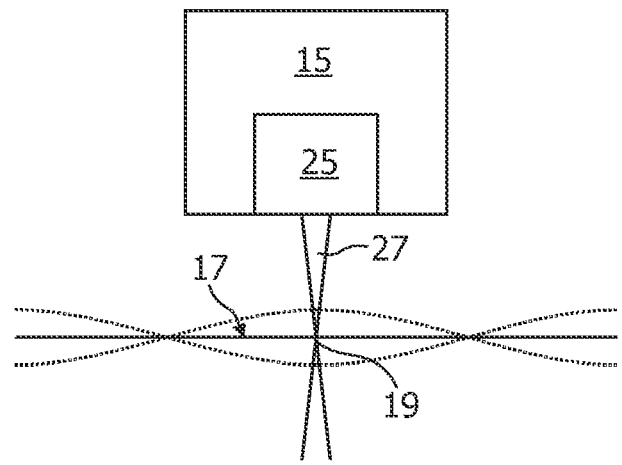
Figure 4:
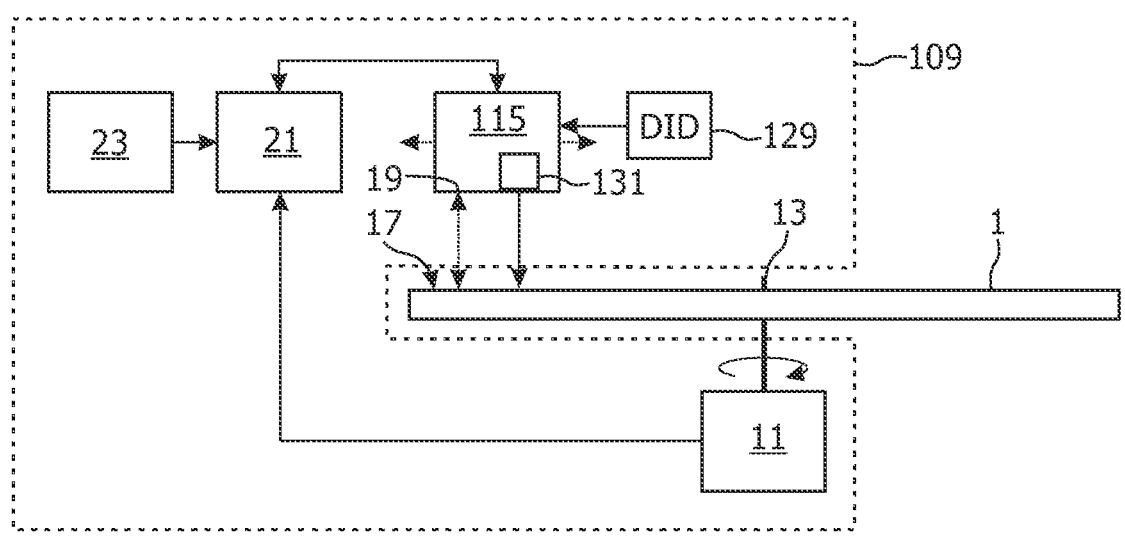
Figure 5:
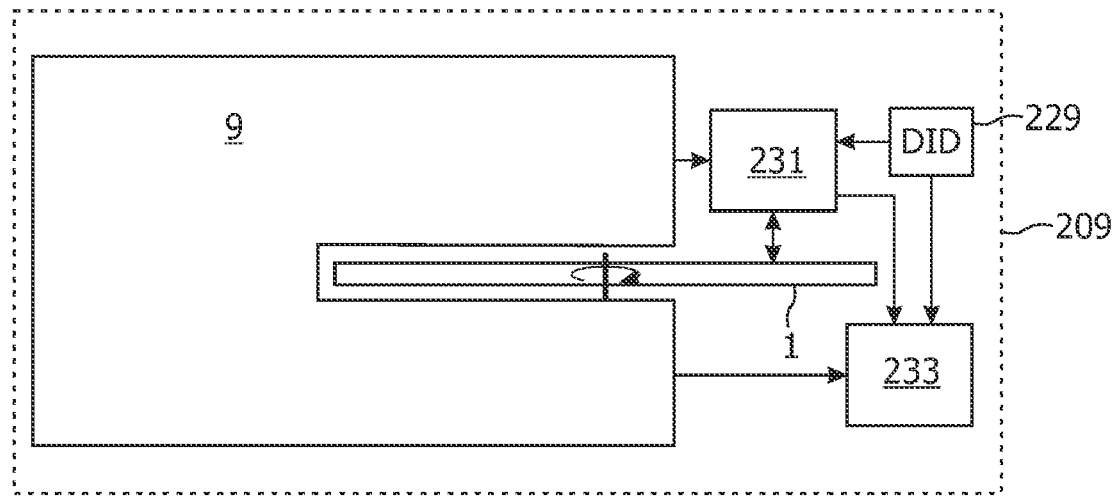
Figure 6:
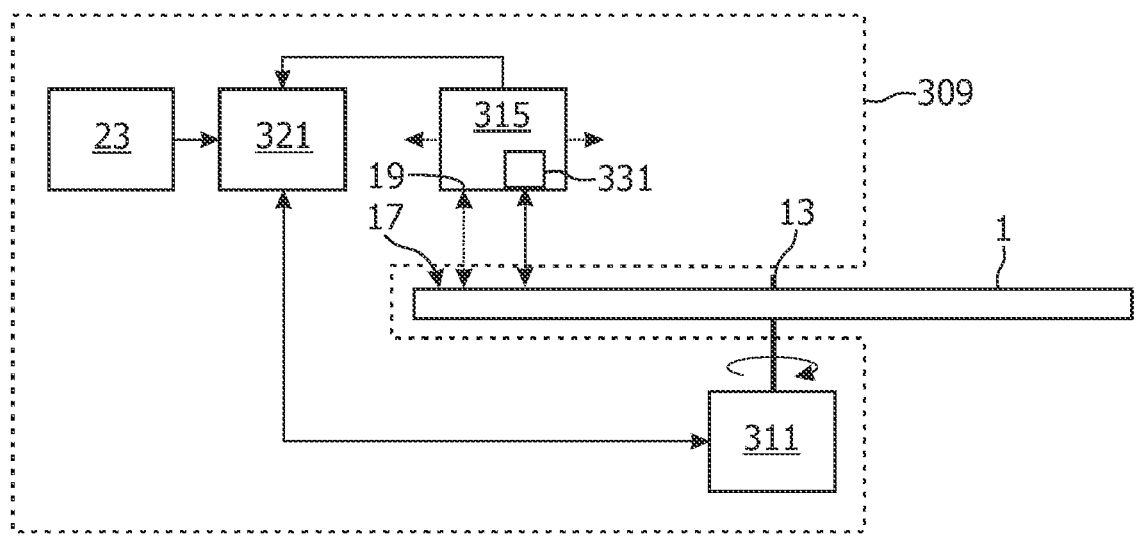
Figure 7:
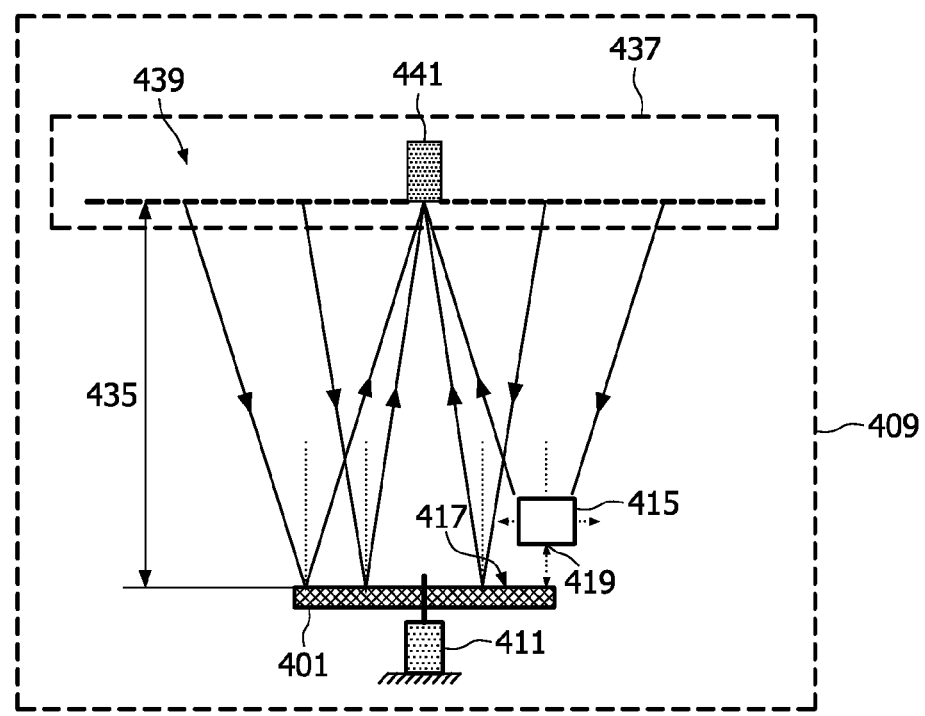
Figures 8A, 8B:
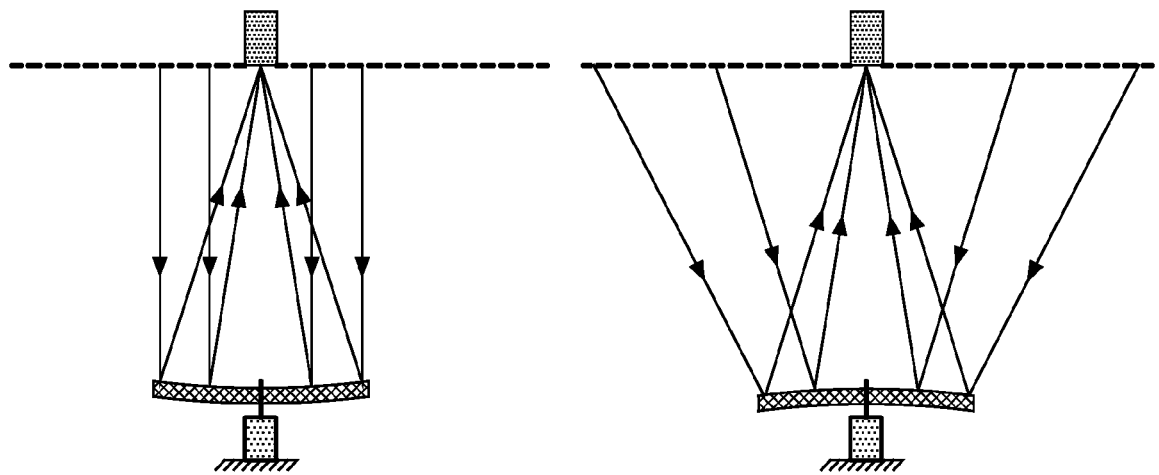
Figure 9:
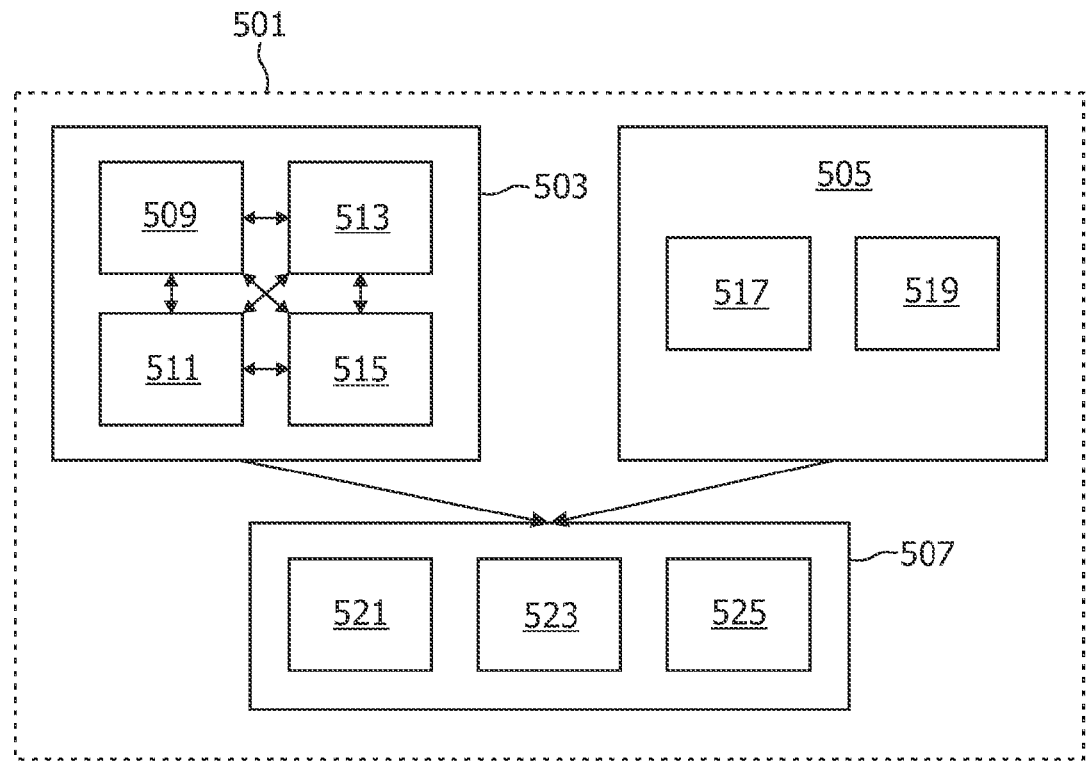
Figure 10:
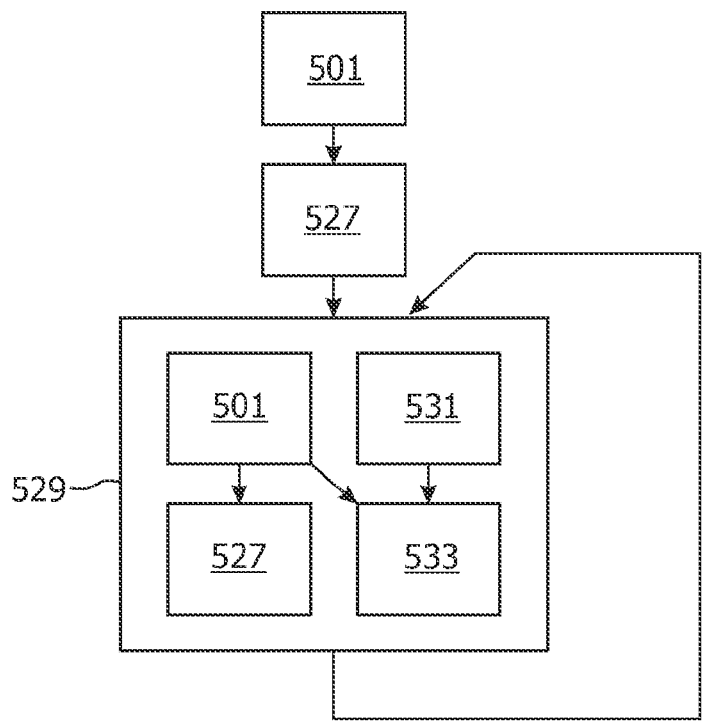
Figure 11:
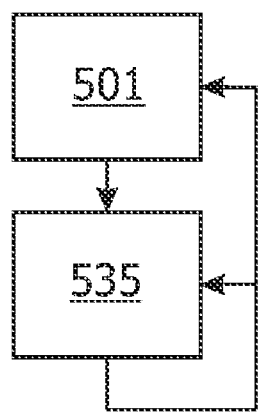
Figure 12:
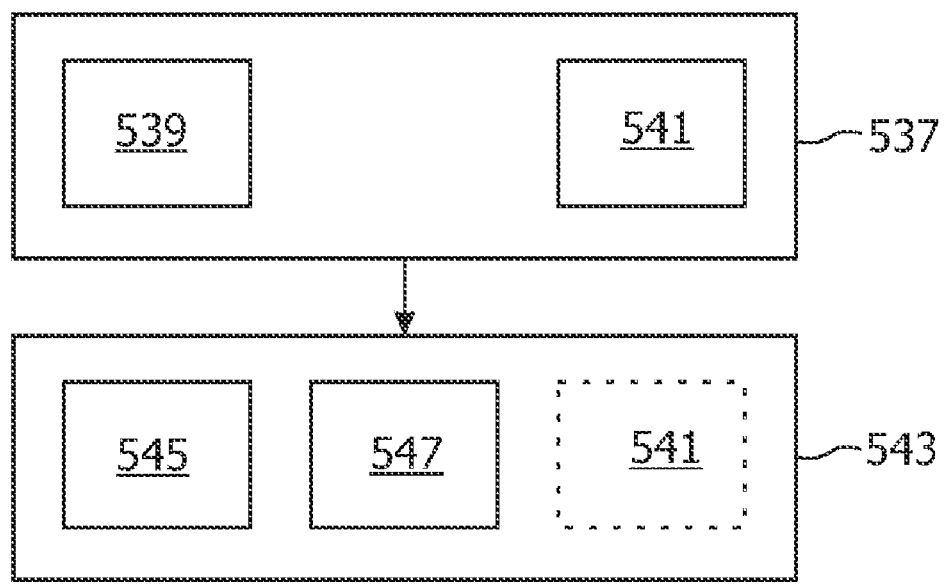
Figure 13:
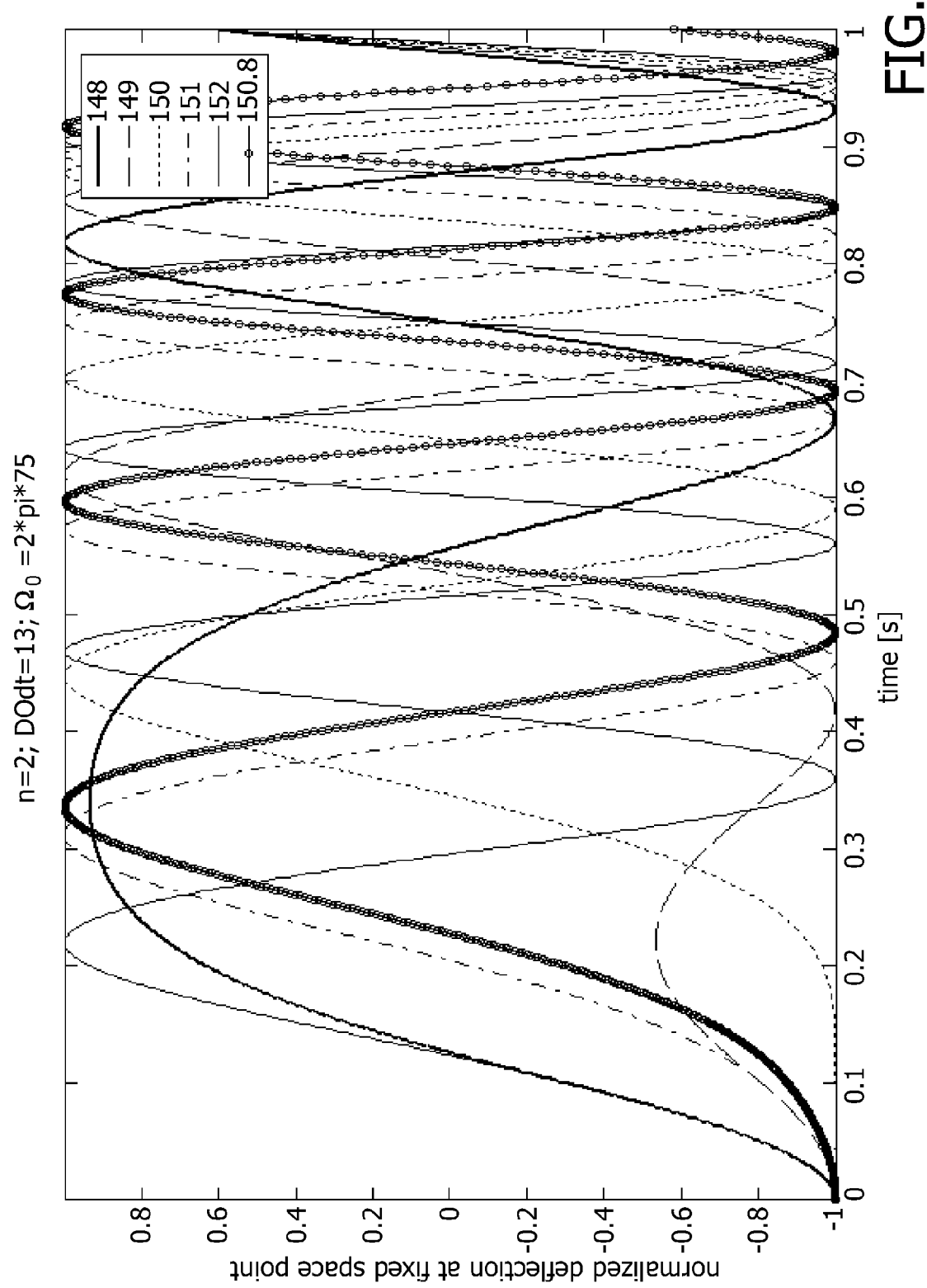

In the following the present invention will be described in more detail with reference to preferred embodiments illustrated in the accompanying Figures, in which FIG. 1 schematically illustrates the deflection of an optical data carrier, FIG. 2 schematically shows a first embodiment of a device for determining a critical rotation speed of an optical data carrier according to the present invention, FIG. 3 schematically shows an optical unit for directing a focused radiation beam to a surface of an optical data carrier, FIG. 4 schematically shows a second embodiment of a device for determining a critical rotation speed of an optical data carrier according to the present invention, FIG. 5 schematically shows an apparatus for monitoring a condition of an optical data carrier according to the present invention, FIG. 6 schematically shows an apparatus for reading data from and/or writing data to an optical data carrier according to the present invention, FIG. 7 schematically shows a device for generating a reference signal according to the present invention, FIGS. 8a, 8b schematically illustrate the effect of a deflection of the optical data carrier in a device as shown in FIG. 7, FIG. 9 is a flowchart illustrating a method of determining a critical rotation speed according to the present invention, FIG. 10 is a flowchart illustrating a method of monitoring a condition of an optical data carrier according to the present invention, FIG. 11 is a flowchart illustrating a method of reading data from and/or writing data to an optical data carrier according to the present invention, FIG. 12 is a flowchart illustrating a method of generating a reference signal according to the present invention, and FIG. 13 shows exemplary measurement signals and reference signals.

FIG. 1 schematically illustrates the deflection of an optical data carrier 1. The optical data carrier 1 may be deformed or deflected and exhibits a stationary waveform. Such a stationary waveform is indicated by the dashed line 3. The deflection is indicated by arrows 5. The illustrated stationary waveform has a number of nodes 7, i.e. regions of the optical data carrier 1 where the surface of the non-deformed data carrier coincides with the deflected surface except of a difference in tilt of the surface.

FIG. 2 schematically shows a first embodiment of a device 9 for determining a critical rotation speed of an optical data carrier 1 according to the present invention. The device 9 comprises a drive unit 11 with a spindle 13, a measurement unit 15, a storage unit 23, and a determination unit 21 connected to the drive unit 11, the measurement unit 15, and the storage unit 23. The drive unit 11 rotates the optical data carrier 1 via the spindle 13 and transmits rotation data, e.g. on the rotation speed, to the determination unit 21. The measurement unit 15 is adapted for measuring a distance between a surface 17 of the optical data carrier 1 and a reference position 19 (indicated by the dotted double-headed arrow) and for generating a measurement signal indicative of this distance, which is transmitted to the determination unit 21. The determination unit 21 receives at least one reference signal from the storage unit 23 and processes the measurement signal received from the measurement unit 15 by comparing the measurement signal with the reference signal. This comparison may be repeated with several other reference signals.

When a match is found, i.e. a measurement signal is sufficiently similar to a reference signal, the critical rotation speed(s) associated with the respective reference signal is (are) considered to be the critical rotation speed(s) of the present combination of device 9 and optical data carrier 1, and thus a critical rotation speed of the optical data carrier. Alternatively and/or additionally to this comparison process, the determining unit 21 may be adapted for processing the measurement signal by performing e.g. a pattern recognition in order to determine a critical rotation speed. The measurement unit 15 is movable along the optical data carrier, as indicated by the dotted arrows.

FIG. 3 schematically shows an optical unit 25 for directing a focused radiation beam to a surface of an optical data carrier 1. The measurement unit 15 comprises an optical unit 25. The optical unit 25 is adapted for directing a focused laser beam 27 to a surface 17 of an optical data carrier 1. The optical unit 25 is further adapted for detecting the laser light reflected by said surface 17 and for detecting a deviation of the focus 19 from the surface 17, e.g. from the shape of the reflected beam. An oscillation of the surface 17 is indicated by the dotted lines. Optical pickup units of commonly used optical disc drives are often controlled in a similar way to have the focus of their laser beam on the plane or surface of the optical disc from which data is to be read out or to which data is to be written. Thus, a measurement unit 15 may be implemented as a common optical pickup unit, wherein the focus actuator signals are transmitted to the determining unit 21 (cf. FIG. 2) as the measurement signal.

FIG. 4 schematically shows a second embodiment of a device 109 for determining a critical rotation speed of an optical data carrier 1 according to the present invention. The device 109 is somewhat similar to the device 9 shown in FIG. 2. It comprises a drive unit 11 with a spindle 13, a measurement unit 115, a storage unit 23, and a determining unit 21 connected to the drive unit 11, the measurement unit 115, and the storage unit 23. The measurement unit 115 comprises a data unit 131 and is further connected to an identifier unit 129, which stores a serial number DID that substantially uniquely identifies the device 109. At least one critical rotation speed of the optical data carrier 1 within the device 109 is determined in a manner similar to that of the device 9 shown in FIG. 2. Once determined, the at least one critical rotation speed is transmitted from the determining unit 21 to the data unit 131 within the measurement unit 109. The data unit 131 records the determined critical rotation speed(s) together with the serial number DID of the device 109 on the optical data carrier 1. Thus, the determined critical rotation speed(s) may be retrieved at a later time from the data carrier 1 and associated with the particular device 109 to which the serial number DID belongs. Alternatively or additionally to the recording of the critical rotation speed(s), the measurement signal itself or a derivative thereof may be recorded.

FIG. 5 schematically shows an apparatus 209 for monitoring a condition of an optical data carrier 1 according to the present invention. The apparatus 209 comprises a device 9 for determining a critical rotation speed of the optical data carrier 1 as described above. The apparatus further comprises an identifier unit 229, a data unit 231, and a monitoring unit 233, which are interconnected. The device 9 is also connected to the data unit 231 and the monitoring unit 233. The device 9 determines one or more critical rotation speeds of the optical data carrier 1 and transmits the determined data to the data unit 231, which records the determined data together with the serial number DID stored in the identifier unit 229 on the data carrier 1, similar to what was described above with reference to FIG. 4. Furthermore, the data unit 231 is adapted for reading out previously recorded data from the data carrier 1 and for transmitting it to the monitoring unit 233. The monitoring unit receives previously recorded data from the data unit 231, including at least one critical rotation speed and/or measurement signal belonging to the data carrier 1 and a serial number of the device by which the data was originally acquired, and the newly determined critical rotation speed(s) and/or a newly generated measurement signal from the device 9. By comparing previously obtained data with newly generated or determined data the measurement unit 15 can decide whether or not there is a significant change in the condition of the optical data carrier, e.g. whether the data carrier has seriously deteriorated. If there is such a significant deterioration, a backup of the data recorded on the optical data carrier may be performed by the user in response to an indication to this effect by the apparatus 209.

It is an option to provide in addition some indication of the time at which the recorded data was recorded, e.g. a time stamp. Thus, a change in condition of the monitored data carrier 1 can be observed over time. In this context it is preferable to provide as large as possible a number of data packets on the data carrier 1 corresponding to a number of different instances of determining a critical rotation speed of the data carrier 1. In order to waste no recording space on the data carrier 1, however, it is possible to provide only a small number of packets, for example with the oldest packet being replaced by the newest one. It is even possible to read out the data from the data carrier 1 first and then to write the new data over the old data.

FIG. 6 schematically shows an apparatus 309 for reading data from and/or writing data to an optical data carrier 1 according to the present invention. The apparatus 309 is somewhat similar to the device 109 illustrated in FIG. 4 and includes the features of device 9 illustrated in FIG. 2. The apparatus comprises a drive unit 311 with a spindle 13, a measurement unit 315, a storage unit 23, and a determining unit 321 connected to the drive unit 311, the measurement unit 315, and the storage unit 23. The measurement unit 315 comprises a read-write unit 331. At least one critical rotation speed of the optical data carrier 1 within the apparatus 309 is determined in a manner similar to that of the device 9 shown in FIG. 2 or 109 shown in FIG. 4. Once determined, the at least one critical rotation speed is transmitted from the determining unit 321 to the drive unit 311. The drive unit 311 is now able to avoid the determined critical rotation speed(s) during the operation of the apparatus 309. The read-write unit 331 is adapted for recording user data on the data carrier 1 and/or reading data from the data carrier 1. In order to allow an optimum performance of the read-write unit 331, the drive unit 311 may rotate the data carrier 1 at the highest rotation speed which is considered to be safe in view of the determined critical rotation speed(s).

FIG. 7 schematically shows a device 409 for generating a reference signal according to the present invention. The device 409 comprises a reference drive unit 411, a reference measurement unit 415, and a surface unit 437. The surface unit 437 includes a plurality of light sources 439 and a high-speed camera 441. The light sources 439 are arranged at a distance 435 from a reference disc 401 having a mirror surface 417 and emit light which is reflected at the mirror surface 417 of the reference disc 401. Thus, the camera 441 detects an image of the light sources 439 reflected by the mirror surface 417. In an alternative embodiment, an illuminated pattern takes the place of the plurality of light sources 439, the camera detecting the reflection of the illuminated pattern reflected by the mirror surface of the reference disc. In FIG. 7 the camera is arranged at the same distance 435 to the reference disc 401 as the light sources 439. However, this is not necessary. Those skilled in the art will easily realize different arrangements with substantially the same or a similar effect (cf. FIGS. 8a, 8b). Furthermore, the reference disc 401 may or may not be an optical data carrier. In particular, it is not necessary that any data is written or recorded on said reference disc 401.

The image detected by the camera 441 renders it possible to measure the shape of the reference data carrier 401 and thus to identify stationary data carrier modes that relate to critical rotation speeds of the reference data carrier 401. Furthermore, the reference measurement unit 415 generates a reference signal indicative of a distance between a surface of the reference data carrier 401 and a reference position 419 in a manner similar or identical to the manner in which the measurement units described above generate a measurement signal. The combination of apparatus 409 and reference data carrier 401 was found to be capable of mapping the combination of a particular disc drive the apparatus 409 is associated with and a particular disc the reference data carrier represents when the dynamic behaviors of both combinations are substantially the same and therefore the measurement signal and the reference signal are substantially identical. Thus, the reference signal may be used to identify combinations of disc drives with associated data carriers having the same dynamic behavior as the reference combination.

FIGS. 8a, 8b schematically illustrate the effect of a deflection of the optical data carrier in a device as shown in FIG. 7. As can be seen from FIG. 8a, if the disc is deflected such that the outer ends (in this cross-sectional view) are bent upwards, the camera detects only the images of the light sources close to the camera. If, on the other hand, the disc is deflected in the other way as illustrated in FIG. 8b, the camera detects also the images of light sources far away from the camera. Thus, it is possible to reconstruct or calculate the shape of the reflecting surface of the reference data carrier from the image detected by the camera.

FIG. 9 is a flowchart illustrating a method 501 of determining a critical rotation speed according to the present invention. The method 501 comprises the steps of rotating 503 an optical data carrier, generating 505 a measurement signal, and determining 507 the critical rotation speed. The steps of rotating 503 and generating 505 are carried out simultaneously, followed by the step of determining 507. The rotating step 503 includes a predetermined sweep including an acceleration 509, a controlled deceleration 511, a non-driven deceleration 513, and a period of constant speed 515. These substeps may be performed in any order. The generating step 505 of the measurement signal includes a step of directing 517 a focused laser beam to the data carrier and a measuring of a relative distance between the focus of the laser beam and the surface of the data carrier in order to generate the measurement signal. The step of determining may include a comparison 521 by means of an inner product of the measurement signal and a reference signal, a comparison 523 by means of adding up squares of distances, and/or a processing 525 of the measurement signal by an artificial intelligence or some other kind of decision logic.

FIG. 10 is a flowchart illustrating a method of monitoring a condition of an optical data carrier according to the present invention. A step of determining 501 a critical rotation speed according to a method as described above (cf. FIG. 9) is followed by a step of recording 527 the determined critical rotation speed and/or the generated measurement signal to the data carrier. This is followed by a step of monitoring 529 including a determining step 501 of a critical rotation speed, a reading 531 of a previously recorded critical rotation speed and/or a previously recorded measurement signal, a recording 527 of the determined critical rotation speed and/or the measurement signal used for determining the critical rotation speed such that the device can be identified, and a step 533 comparing the determined critical rotation speed with the previously recorded critical rotation speed and/or comparing 533 the generated measurement signal with the previously recorded measurement signal. The order of these steps may vary as long as the comparing 533 comes after the determining 501 and the reading 531 and as long as the recording 527 comes after the determining 501. It is not necessary for the determining 501 and the reading 531 to be performed simultaneously or for the recording 527 to take places after the reading 531. The step of monitoring 529 may be repeated.

FIG. 11 is a flowchart illustrating a method of reading data from and/or writing data to an optical data carrier according to the present invention. After a determining step 501 of a critical rotation speed of the optical data carrier at hand according to a method as described above, a step 535 of reading data from and/or writing data to the optical data carrier follows, wherein the optical data carrier is rotated at a rotation speed which is different from the determined critical rotation speed. The method may either continue with a further determination 501 or a further step 535 of recording/writing.

FIG. 12 is a flowchart illustrating a method of generating a reference signal according to the present invention. The method of generating a reference signal includes two kinds of operations. A first operation 537 includes a step of rotating 539 a reference disc in a reference drive at several rotation speeds substantially covering the complete range of rotation speeds the drive is capable of and a step of measuring 541 the shape of a surface of the reference disc. This renders it possible to detect one or more rotation speeds that may be considered to be critical, i.e. which endanger either the performance or the safety of the drive and disc. A second operation 543 includes a step of rotating 545 the reference disc in the reference drive according to a predetermined sweep and a step of generating 547 a reference signal corresponding to the sweep. The reference signal is indicative of a distance between a surface of the reference disc and a reference position. It may be used for determining a critical rotation speed of a common optical data carrier in a consumer's drive with which the reference drive is associated by comparing the reference signal with a measurement signal as described above. The two operations may be performed in any order, including a simultaneous performance, i.e. generating 547 the reference signal and measuring 541 the shape of the surface at the same time during rotating 539, 545 of the reference disc 401.

FIG. 13 shows exemplary measurement signals and reference signals. It has long been experienced that a rotating disc can assume a deflected shape. The disc seems to stand still; in fact each disc material point vibrates with a very specific frequency while turning around. Such a shape is called a stationary disc mode here. It is sufficient for this explanation to consider a mode pair of which both eigenmodes vibrate with the same natural frequency, the mode shapes having a 90° shift over the disc circumference and a 90° phase shift in time.

If these two vibrations manifest themselves simultaneously, the result is a disc that seems to be deflected without rotation; which is of course not true; the disc does vibrate, but looking at the disc from a fixed spatial position (focus point) no motion can be detected. A way to distinguish a deflected shape from a non-deflected shape using only a fixed-point motion detector is to vary the rotation speed.

To illustrate the idea, first the simple model for the deflection of only one mode-pair is given. Let the disc be axially symmetrical. For the clarity of illustration we concentrate on the perimeter of the disc. One might say we only model a representative ring from the disc. Then the axial deflection associated with an eigenmode with n nodes along the perimeter (nodal lines for an equivalent disc) can be represented by $$A \sin(n\theta)\sin(\omega t) \quad (1)$$

in which $\theta$ is the angle along the circumference, $\omega$ is the eigenfrequency, A the amplitude and t the time. There will always be a second accompanying mode perpendicular to this first mode for reasons of axial symmetry. Instead of the first sine in (1), we will have a cosine for the second mode. The phase difference may have any value.

With a 90° phase difference a stationary mode can occur, as will be explained below. The total deflection may be expressed by $$u_d(\theta,t) = A \sin(n\theta)\sin(\omega t) + B \sin(n\theta)\sin(\omega t) \quad (2)$$

and a rotation of the disc is modeled by introducing a $\theta$ that is linear in time:

$$\theta = \Theta - \Omega t \quad (3)$$

where $\Theta$ is the angle of detection of the deflection in fixed space and $\Omega$ is the rotation speed.

Using $$\cos(\alpha+\beta) = \cos\alpha \cos\beta - \sin\alpha \sin\beta$$

$$\cos(\alpha-3) = \cos\alpha \cos\beta + \sin\alpha \sin\beta \quad (4)$$

we can derive the following formulas $$\sin\alpha \sin\beta = \tfrac{1}{2}\cos(\alpha-\beta) - \tfrac{1}{2}\cos(\alpha+\beta)$$

$$\cos\alpha \cos\beta = \tfrac{1}{2}\cos(\alpha-\beta) + \tfrac{1}{2}\cos(\alpha+\beta) \quad (5)$$

We substitute (3) in (2) and rewrite it using (5) to get $$\begin{aligned}
u_d(\Theta,t) &= A\sin(n\Theta - n\Omega t)\sin(\omega t) + B\sin(n\Theta - n\Omega t)\sin(\omega t) \\
&= A\left[\tfrac{1}{2}\cos(n\Theta - n\Omega t - \omega t) - \tfrac{1}{2}\cos(n\Theta - n\Omega t + \omega t)\right] + \\
&\quad B\left[\tfrac{1}{2}\cos(n\Theta - n\Omega t - \omega t) + \tfrac{1}{2}\cos(n\Theta - n\Omega t + \omega t)\right] \\
&= A\left[\tfrac{1}{2}\cos(n\Theta - (n\Omega+\omega)t) - \tfrac{1}{2}\cos(n\Theta - (n\Omega-\omega)t)\right] + \\
&\quad B\left[\tfrac{1}{2}\cos(n\Theta - (n\Omega+\omega)t) + \tfrac{1}{2}\cos(n\Theta - (n\Omega-\omega)t)\right]
\end{aligned} \quad (6)$$

Now it can be seen that setting A=−B gives an expression for the deflection as seen from the fixed world with only a cosine function.

$$u_d(\Theta,t) = B\cos(n\Theta - (n\Omega-\omega)t) \quad (7)$$

This is a so-called backward traveling wave. Similarly, setting A=B yields a forward traveling wave. The last step towards a stationary mode is to fix the rotation frequency to the eigenfrequency. This will eliminate the explicit time dependence in the backward traveling wave in (7). The condition for a stationary mode thus is $$\Omega = \omega/n \quad (8)$$

As long as (8) is fulfilled, a detector will only see a DC component while the disc is certainly vibrating.

$$u_d(\Theta,t) = B\cos(n\Theta) \text{ for } \Omega=\omega/n \quad (9)$$

Note that it is not possible to make the forward traveling wave time independent, as $(n\Omega+\omega)t$ can never be zero.

If the rotation speed is not constant but e.g. decreasing, an AC component will appear. To illustrate the effect, consider a constant acceleration $\Omega'$ (deceleration if this derivative is negative).

$$\Omega(t) = \Omega_0 + \Omega' t \quad (10)$$

Equation (10) can be substituted into (7) to simulate the effect. In the model used, the disc can only vibrate in a saddle mode, so n=2. The rotation speed is chosen equal to 75 Hz. We know that, for a disc with a saddle mode frequency of 150 Hz, a stationary saddle mode can develop provided there is a constant external force working. The rotation speed remains 75 Hz for the first 0.1 second, after which the deceleration starts with $\Omega'=-13$ rad/s. FIG. 13 shows that a disc with 150 Hz natural frequency (the dotted line) initially has a constant deflection (normalized −1). If the rotation speed does not change, no vibration (AC component) will be visible at all. At 0.1 seconds the deceleration starts, however, and only then does it become apparent that the disc did already vibrate internally. FIG. 13 also shows the initial constant speed vibration and subsequent deceleration transient responses for discs with other natural frequencies. To be specific, the time signals of the deflection plotted are those for $\omega = 2\pi[148\ 149\ 150\ 151\ 152\ 150.82]$. The first five 'discs' with saddle mode frequencies 148 Hz, 149 Hz, 150 Hz, 151 Hz, and 152 Hz represent reference discs with known dynamic properties. The last disc with saddle mode frequency 150.82 Hz represents an unknown disc of which we want to identify the natural frequency. The way this is done basically is by taking inner products of the time signal of the unknown disc with all the others. The highest value points to the dynamically most similar disc. In this example, the normalized inner products are ip=[0.1929 0.1214 −0.0741 0.7931 0.1202]. The fourth value is clearly the highest, so the "unknown" disc is most similar to disc 4, of which we know that the saddle mode natural frequency is 151 Hz. The result of an averaging of the times between the zero crossings of the signals over one second is as follows: [0.4727 0.2396 0.2203 0.1980 0.1739]. The signal of the "unknown" disc (150.82 Hz) shows an average time between zero crossings of 0.1981, which points clearly to the fourth reference having a frequency of 151 Hz.

The example given above does not take into account that there is a damping in practice. The actual signals may fade due to damping and loss of tuning of self-excitation due to a changed (e.g. reduced) rotation frequency (or rotation speed).

In particular at high speeds there is a (possibly) quick succession of dynamic effects, i.e. of oscillations and deformations of the optical data carrier, including one or more stationary waveforms. For example, a typical dynamic behavior may be identified from a comparison of these dynamic effects with those of reference discs, and thus a critical rotation speed can be determined. The determination of a critical rotation speed according to the present invention may be performed during normal operation, and it is not necessary to provide a time-consuming process of testing during which no reading or writing is possible.

It is possible to apply the present invention in (semi-)professional testers, wherein databases of dynamic properties for different disc types and designs can be built up. Furthermore, it is possible to compare the performance of drives and discs fairly if there is a standardized evaluation method as provided by the present invention.

The invention claimed is:

1. A device for determining a critical rotation speed of an optical data carrier at which a critical deflection of said optical data carrier may occur in said device, said device comprising:
   a drive unit for rotating said optical data carrier, said drive unit being adapted for rotating said optical data carrier according to a sweep covering a predetermined range of rotation speeds,
   a measurement unit for generating a measurement signal indicative of a distance between a surface of said optical data carrier and a reference position corresponding to said sweep, and
   a determination unit for determining said critical rotation speed of said optical data carrier by processing said measurement signal on the basis of at least one characteristic of said measurement signal.

2. The device of claim 1, wherein said determination unit is adapted for processing said measurement signal by comparing said measurement signal with at least one predetermined reference signal.

3. The device of claim 2, wherein said determination unit is adapted for comparing said measurement signal with said at least one predetermined reference signal:
   by calculating an inner product of said measurement signal and said reference signal, and/or
   by adding up squares of differences between said measurement signal and said reference signal, and/or
   by comparing a period between consecutive intersections of said measurement signal with a predetermined line parallel to the abscissa with a period between consecutive intersections of said reference signal with said line, in particular averaged over a predetermined period of time.

4. The device of claim 1, wherein said determination unit is adapted for processing said measurement signal by performing pattern recognition on said measurement signal.

5. The device of claim 1, wherein said measurement unit comprises an optical unit for directing a focused radiation beam to a surface of said optical data carrier, said reference position being the position of a focus of said irradiation beam.

6. The device of claim 1, wherein said measurement unit is adapted for generating a rotation timing signal associated with said measurement signal, and wherein said determination unit is adapted for using said rotation timing signal for processing said measurement signal.

7. The device of claim 1, wherein said sweep includes an acceleration of said optical data carrier during a start-up of said device and/or a deceleration of said optical data carrier, in particular a non-driven deceleration of said optical data carrier.

8. The device of claim 1, wherein said sweep includes a sub-sweep of slow speed and a sub-sweep of medium speed for determining a static shape of said optical data carrier.

9. The device of claim 1, wherein said sweep includes a period of constant rotation speed.

10. The device of claim 1, further comprising:
    a device identifier identifying said device and
    a data unit for recording said determined critical rotation speed and/or said measurement signal together with said device identifier on said optical data carrier.

11. A method of determining a critical rotation speed of an optical data carrier at which a critical deflection of said optical data carrier may occur, said method comprising the steps of:
    rotating said optical data carrier according to a sweep covering a predetermined range of rotation speeds,
    generating a measurement signal indicative of a distance between a surface of said optical data carrier and a reference position, and
    determining said critical rotation speed of said optical data carrier by processing said measurement signal corresponding to said sweep on the basis of at least one characteristic of said measurement signal.

12. A non-transitory media containing a computer program comprising program code means for causing a device for determining a critical rotation speed of an optical data carrier to perform a method as claimed in claim 11 when said computer program is run on said device.

13. An apparatus for monitoring a condition of an optical data carrier, said apparatus comprising:
    a device for determining a critical rotation speed of said optical data carrier as claimed in claim 1,
    a device identifier identifying said device,
    a data unit for recording said determined critical rotation speed and/or said measurement signal together with said device identifier on said optical data carrier and for reading a recorded critical rotation speed and/or a recorded measurement signal previously recorded by said apparatus on said data carrier, and
    a monitoring unit for comparing said determined critical rotation speed with said recorded critical rotation speed and/or for comparing said generated measurement signal with said recorded measurement signal.

14. A method of monitoring a condition of an optical data carrier, said method comprising the steps of:
    determining a critical rotation speed of said optical data carrier by a method of determining as claimed in claim 11,
    reading a previously recorded critical rotation speed and/or a previously recorded measurement signal from said data carrier associated with the device by which said method of determining is performed, recording said determined critical rotation speed and/or said measurement signal together with a device identifier identifying said device on said optical data carrier, and comparing said determined critical rotation speed with said recorded critical rotation speed and/or comparing said generated measurement signal with said recorded measurement signal.

15. A non-transitory media containing a computer program comprising program code means for causing an apparatus for monitoring a condition of an optical data carrier to perform a method as claimed in claim 14 when said computer program is run on said apparatus.

16. An apparatus for reading data from and/or writing data to an optical data carrier, said apparatus comprising:
   a device for determining a critical rotation speed of said optical data carrier as claimed in claim 1 and
   a read-write unit for reading data from and/or writing data to said optical data carrier,
wherein said drive unit of said device is adapted for avoiding a rotation of said optical data carrier at said determined critical rotation speed during a reading and/or writing action of said read-write unit.

17. A method of reading data from and/or writing data to an optical data carrier, said method comprising the steps of:
   determining a critical rotation speed of said optical data carrier by a method of determining as claimed in claim 11,
   reading data from and/or writing data to said optical data carrier during rotation of said optical data carrier at a rotation speed that is different from said determined critical rotation speed.

18. A non-transitory media containing a computer program comprising program code means for causing an apparatus for reading data from and/or writing data to an optical data carrier to perform a method as claimed in claim 17 when said computer program is run on said apparatus.

19. A device for generating a reference signal to be used for determining a critical rotation speed of an optical data carrier, said device comprising
   a reference drive unit for rotating a reference disc, said reference drive unit being adapted for rotating said reference disc according to a sweep covering a predetermined range of rotation speeds,
   a reference measurement unit for generating said reference signal indicative of a distance between a surface of said reference disc and a reference position, said reference signal corresponding to said sweep, and
   a surface unit for measuring the shape of said surface of said reference disc.

20. A method of generating a reference signal to be used for determining a critical rotation speed of an optical data carrier, said method comprising the steps of
   rotating a reference disc,
   generating said reference signal indicative of a distance between a surface of said reference disc and a reference position, said reference signal corresponding to a sweep covering a predetermined range of rotation speeds, and
   measuring the shape of said surface of said reference disc.

21. A non-transitory media containing a computer program comprising program code means for causing a device for generating a reference signal to be used for determining a critical rotation speed of an optical data carrier to perform a method as claimed in claim 20 when said computer program is run on said device.

* * * * *